United States Patent
Nozaki et al.

(10) Patent No.: US 6,918,536 B2
(45) Date of Patent: Jul. 19, 2005

(54) MONITORING SYSTEM FOR AUTOMATED TELLER MACHINE AND MONITORING APPARATUS FOR AUTOMATED TELLER MACHINE

(75) Inventors: Shuuichi Nozaki, Seto (JP); Yoshiko Kinoshita, Owariasahi (JP); Toshiyuki Yamauchi, Nagoya (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 10/617,882

(22) Filed: Jul. 14, 2003

(65) Prior Publication Data

US 2004/0050927 A1 Mar. 18, 2004

(30) Foreign Application Priority Data

Jul. 25, 2002 (JP) .................................... 2002-216820

(51) Int. Cl.⁷ .............................................. G06K 19/06
(52) U.S. Cl. ....................................................... 235/379
(58) Field of Search ................................. 235/375, 379

(56) References Cited

U.S. PATENT DOCUMENTS 5,590,188 A * 12/1996 Crockett ................ 379/265.02
6,742,141 B1 * 5/2004 Miller .......................... 714/26
2003/0007625 A1 * 1/2003 Pines et al. ................. 379/223

FOREIGN PATENT DOCUMENTS

| JP | 08-16676 | 1/1996 |
| JP | 11-219466 | 8/1999 |
| JP | 11-272924 | 10/1999 |
| JP | P2001-111696 A | 4/2001 |

* cited by examiner

Primary Examiner—Mark Tremblay
(74) Attorney, Agent, or Firm—McDermott Will & Emery LLP (57) ABSTRACT

A monitoring apparatus for an automated teller machine (ATM), a call center, and a monitoring system. Even when a call center installed in an area is not in its service hours, the system can cope with an inquiry from a user in real time and realize a smooth 24-hour service. The system includes the ATM, the call center for monitoring and controlling the state of the automated teller machine at a remote place, and the monitoring apparatus for sequentially registering run information received from the ATM, service information and operator information received from various locations in the world. When receiving an inquiry from a user, the monitoring apparatus refers to information previously held in a storage within the monitoring apparatus, transmits the inquiry to the call center in service, and also transmits machine information and operation information of the monitoring apparatus from the monitoring apparatus to the call center.

14 Claims, 11 Drawing Sheets

OPERATOR TABLE 113

| OPERATOR No. | OPERATOR ID | USE LANGUAGE | RECEPTION SKILL DEGREE | MACHINE KNOWLEDGE LEVEL | ACCESS FREQUENCY |
|---|---|---|---|---|---|
| 1 | xxxxxxx | A, B, C, D, E, F | A | A | n1 |
| 2 | xxxxxxx | A, B, C, E, F | A | B | n2 |
| 3 | xxxxxxx | A, B, C, E | B | B | n3 |
| | | | | | |

FIG. 5

CALL CENTER MANAGEMENT TABLE 112

| CALL CENTER No. | SERVICE STATE | OPERATOR INFORMATION | LOCATION | KEY TELEPHONE No. | | | | | | |
|---|---|---|---|---|---|---|---|---|---|---|
| 1 | IN SERVICE | BUSY | JAPAN | xxxxxxx | — | | | | — | |
| 2 | IN SERVICE | READY | CHINA | xxxxxxx | | | | | | |
| 3 | IN SERVICE | READY | KOREA | xxxxxxx | | | | | | |
| 4 | STOP | — | INDIA | xxxxxxx | | | | | | |
| 5 | NOT IN SERVICE | — | U.S. | xxxxxxx | | | | | | |
| — | — | — | — | — | | | | | | |
| — | — | — | — | — | | | | | | |
| — | — | — | — | — | | | | | | |
| — | — | — | — | — | | | | | | |

FIG. 6

CALL CENTER ACCESS TABLE                                              111

| INQUIRY TIME ZONE | LOCATION OF CALL CENTER TO BE ACCESSED | | | | | |
| --- | --- | --- | --- | --- | --- | --- |
| | 1 | 2 | 3 | ... | ... | n |
| 800~2100 | JAPAN A | JAPAN B | U.S. A | | | INDIA |
| 2100~2400 | U.S. A | U.S. B | CANADA | | | U.K. |
| 2400~400 | KOREA | CHINA A | INDIA | | | U.S. C |
| 400~800 | CHINA B | FRANCE | GERMANY | | | U.K. |

FIG. 7

RUN INFORMATION

| MACHINE NUMBER | DATE | TIME | OPERATION CONTENTS |
|---|---|---|---|
| MACHINE 08 | 01/23/2001 | 09:01:05 | DEPOSIT, DEPOSITED BILL, 5 ONE-THOUSAND-YEN BILLS, 10 ONE-TEN-THOUSAND-YEN BILLS, 2 RETRIES OF CARD FEED |
| | 01/23/2001 | 09:03:45 | WITHDRAWAL, WITHDRAWN BILL, 2 ONE-THOUSAND-YEN BILL, 9 ONE-TEN-THOUSAND-YEN BILLS, ABNORMAL SENSOR (DISCRIMINATOR) |
| | 01/23/2001 | 09:10:03 | BANKBOOK PRINTING, 10 PRINTED LINES, 1 PAGING |
| | ... | ... | ... |
| | 01/24/2001 | 13:01:17 | BALANCE REFERENCE, 2 RETRIES OF CARD READING OPERATION |
| | 01/24/2001 | 13:09:21 | DEPOSIT, DEPOSITED BILL, 2 ONE-THOUSAND-YEN BILLS, 50 ONE-TEN-THOUSAND-YEN BILLS, 3 ONE-TEN-THOUSAND-YEN REJECTED BILLS |
| | ... | ... | ... |

OPERATION INFORMATION

114

| MACHINE NUMBER | DATE | TIME | OPERATIONAL CONTENTS |
|---|---|---|---|
| MACHINE 02 | 01/23/2001 | 09 : 00 : 01 | DEPRESSED DEPOSIT KEY |
| | 01/23/2001 | 09 : 00 : 10 | INSERTED BANKBOOK |
| | 01/23/2001 | 09 : 00 : 20 | ENTERED BILL |
| | 01/23/2001 | 09 : 00 : 35 | DEPRESSED CONFIRMATION KEY |
| | 01/23/2001 | 09 : 00 : 50 | ACCEPTED BANKBOOK |
| | | | |
| | 01/23/2001 | 09 : 01 : 30 | DEPRESSED WITHDRAW KEY |
| | 01/23/2001 | 09 : 01 : 35 | INSERTED CARD |
| | 01/23/2001 | 09 : 01 : 40 | ENTERED PASSWORD |
| | 01/23/2001 | 09 : 01 : 45 | DEPRESSED CORRECTION KEY |
| | 01/23/2001 | 09 : 01 : 55 | ENTERED PASSWORD |
| | 01/23/2001 | 09 : 02 : 05 | ENTERED AMOUNT |
| | 01/23/2001 | 09 : 02 : 15 | DEPRESSED CONFIRMATION KEY |
| | 01/23/2001 | 09 : 02 : 30 | ACCEPTED CARD |
| | 01/23/2001 | 09 : 02 : 35 | ACCEPTED BANK SLIP OR STATEMENT |
| | 01/23/2001 | 09 : 02 : 40 | ACCEPTED BILLS |
| | ⋮ | ⋮ | ⋮ |

FIG. 9

INQUIRY INFORMATION

| MACHINE NUMBER | USE LANGUAGE | INQUIRY TYPE | INSTALLATION LOCATION | DATE | TIME | INQUIRY CONTENTS |
|---|---|---|---|---|---|---|
| MACHINE 03 | B | 23 | 07 | 01/23/2001 | 23:10:00 | CARD INSERTED BUT NOT LOADED |
| | ... | ... | ... | 01/24/2001 | 24:01:15 | FORGOT OPERATIONAL PROCEDURE DURING TRANSFER OPERATION |
| | ... | ... | ... | 01/24/2001 | 05:21:43 | KEY INPUT RESULTED IN FAILURE OF DISPLAY APPEARANCE |
| | ... | ... | ... | ... | ... | ... |

FAULT INFORMATION

| MACHINE NUMBER | USE LANGUAGE | INQUIRY TYPE | INSTALLATION LOCATION | DATE | TIME | FAULT CONTENTS |
|---|---|---|---|---|---|---|
| MACHINE 06 | B | 34 | 25 | 01/23/2001 | 09:47:10 | TRANSFER, JAMMED CARD, CARD FEED PATH B, REMAINED MEDIUM (CARD, BANKBOOK OR BILL) |
| | ... | ... | ... | 01/23/2001 | 12:26:33 | WITHDRAWAL, OFTEN REJECTED, REMAINED MEDIUM (CARD OR BILL) |
| | ... | ... | ... | 01/23/2001 | 17:10:06 | DEPOSIT, ABNORMAL BANKBOOK PAGING, REMAINED MEDIUM (BANKBOOK OR BILL) |
| | ... | ... | ... | ... | ... | ... |

117

MONITORING SYSTEM FOR AUTOMATED TELLER MACHINE AND MONITORING APPARATUS FOR AUTOMATED TELLER MACHINE

BACKGROUND OF THE INVENTION

The present invention relates to a monitoring apparatus for an automated teller machine, a call center, and a monitoring system for the automated teller machine including the monitoring apparatus and the call center, and more particularly, to a technique for enabling response of positive information in real time in response to an inquiry from a user of the automated teller machine.

The inquiry response of the monitoring system for the automated teller machine employs such a method that the automated teller machine and the monitoring apparatus are connected by an LAN link as cited, e.g., in JP-A-11-272924 or JP-A-8-16676 or by a public line as cited in JP-A-11-219466, so that an operator of the call center installed in the same area or in the same country as the monitoring apparatus responds to customer's inquiry on the basis of the information of the automated teller machine and customer's inquiry contents.

SUMMARY OF THE INVENTION

As shown in the above related art, the call center in the monitoring system has a problem that the automated teller machine is operated on a 24-hour basis because the automated teller machines or the monitoring apparatuses are installed in the same area or in the same country as the automated teller machines or the monitoring apparatuses, which results in that the call center has also to be operated on a 24-hour basis to realize the smooth operation of the automated teller machines.

The above JP-A-2001-111696 also shows an example wherein the call center can respond to customer's inquiry on a 24-hour basis using an Internet telephone device. In the Publication example, however, the responding operator of the call center cannot suggest information necessary for solving the problem as in the automated teller machine. For this reason, even when the call center is operated on a 24-hour basis to accept inquiries, the call center cannot acquire machine information necessary for solving the inquiries.

In view of the problems in the related art, it is an object of the present invention to provide a monitoring system or apparatus for an automated teller machine, a call center, and a monitoring system for the automated teller machine including the monitoring apparatus and the call center, which can respond to customers' inquiries in real time, even when the call center, e.g., in Japan is not in its operating time and which can realize 24-hour support, by selecting one of other call centers installed in various areas of the world which is in its service or business hours in a time zone of the inquiry occurrence, by connecting the call center, and by interviewing with the customer over the inquiry while referring to machine information of the automated teller machine.

In accordance with the present invention, the above object is attained by providing a monitoring system which includes a call center for monitoring the states of automated teller machines and remote-controlling the automated teller machines and also includes a monitoring apparatus for controllably managing a network to sequentially monitor run information received from the automated teller machine, business information received from the call centers installed in various areas of the world, and operator information; and, when an inquiry takes place from a customer, which refers to information previously held in a storage of the monitoring apparatus, forwards the inquiry to a call center which is open or in service hours, and also transmits machine information and operation information received from the apparatus thereto.

More specifically, in accordance with an aspect of the present invention:

(1) The monitoring apparatus of the present invention includes a storage means for business information including information about business hours received when the call center starts and closes its work and operator information about operator, choice means, when receiving an inquiry from a customer of the automated teller machine, for referring to the business information and operator information stored in the storage means and selecting one of call centers in its service hours, and a means for forwarding the inquiry to the call center selected by the choice means. The system also includes a means for receiving the run information of the automated teller machine and the operation information of the customer from the automated teller machine, transmitting the operation information and the operation information to the call center selected by the choice means when receiving an inquiry from the customer, and accepting fault information from the automated teller machine and storing it therein; and also includes a means for forwarding a fault declaration received from the customer of the automated teller machine to the call center selected by the choice means, examining the presence or absence of a fault announcement from the automated teller machine and in the case of the presence of the fault announcement, informing the fault information to the call center.

(2) In accordance with a further aspect of the present invention, the call center in the present invention includes a means for transmitting business information including information on business hours when the call center starts or closes its work and operator information on operator to the monitoring apparatus, and a means, when accepting the run information of the automated teller machine, the operator information of the customer, and inquiry information of the customer from the monitoring apparatus, for referring to the run information and the operator information or referring to a question diagnosis or interview result with the customer, and transmitting a reply to the inquiry information to the automated teller machine. The system also includes a means for transmitting business information including information on business hours when the call center starts and closes its work and operator information on operator to the monitoring apparatus; and a means, when accepting fault information of the automated teller machine from the monitoring apparatus and a fault declaration from the customer, for referring to the fault information and an interview result to the customer and transmitting a reply to the fault declaration to the automated teller machine.

(3) In accordance with another aspect of the present invention, the monitoring system for the automated teller machine includes the monitoring apparatus mentioned in the above item (1) and the call center mentioned in the above item (2).

Other objects, features and advantages of the invention will become apparent from the following description of the embodiments of the invention taken in conjunction with the accompanying drawings.

DESCRIPTION OF THE EMBODIMENTS

Embodiments of the present invention will be explained in detail with reference to the accompanying drawings.

Figure 1:
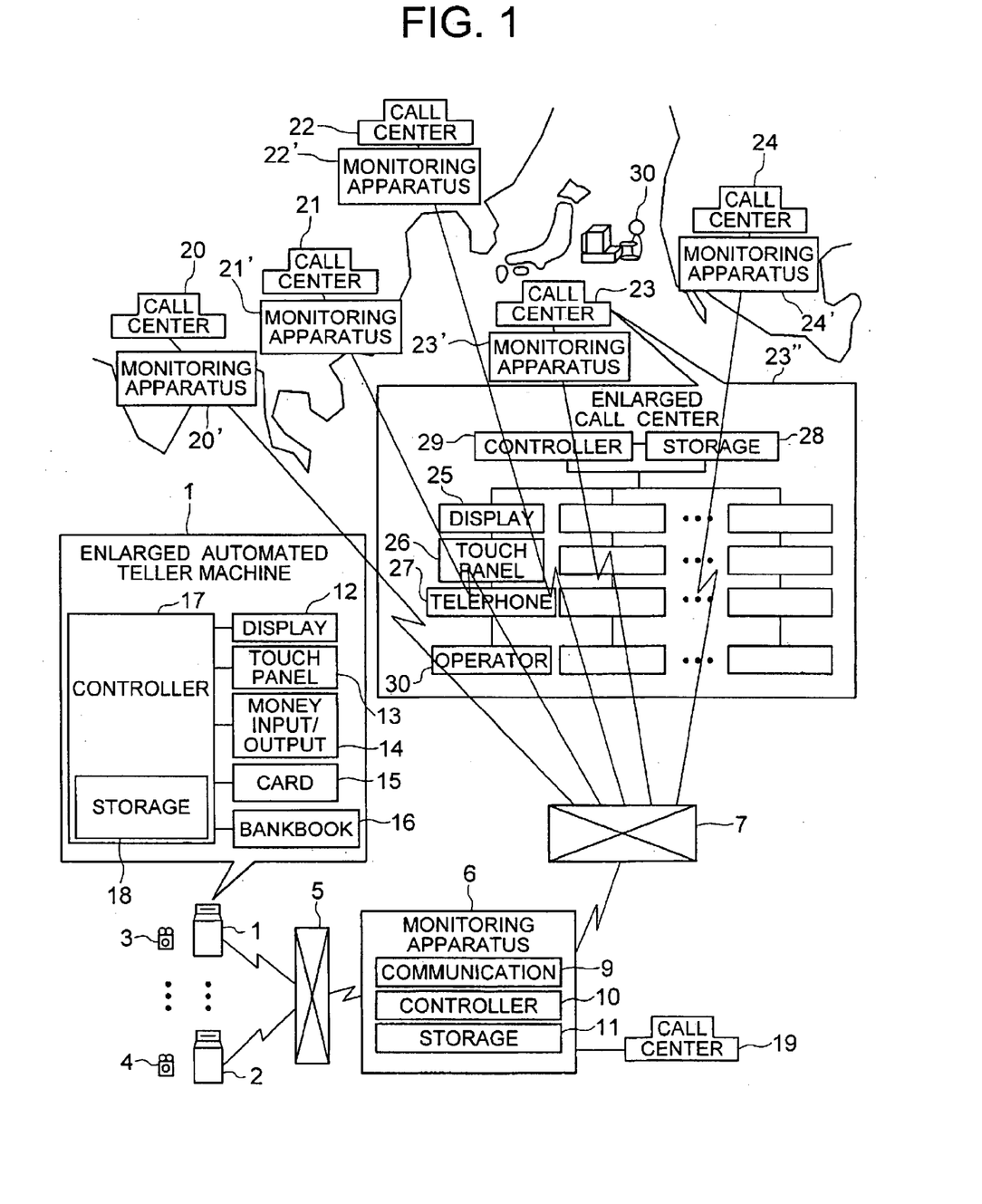
FIG. 1 is a configuration of a monitoring system for an automated teller machine in accordance with an embodiment of the present invention.

FIG. 1 is a configuration of a monitoring system for an automated teller machine in accordance with an embodiment of the present invention.

In the drawing, reference numerals 1 and 2 denote automated teller machines having a function of processing various transactions; numerals 3, 4 and 27 denote telephone devices for use in inquiry and question diagnosis or interview; 6, 20', 21', 22', 23' and 24' denote monitoring apparatuses installed in various areas of the world; 19 to 24 denote call centers connected to the monitoring apparatuses 20', 21', 22', 23' and 24'; 5 denotes a network connected between the automated teller machines 1 and 2 and the monitoring apparatus 6; and 7 denotes a network connected between the monitoring apparatus 6 and the monitoring apparatuses 20', 21', 22', 23' and 24'.

The monitoring apparatus 6 can be connected to the call centers 20 to 24 via the network 7 and the monitoring apparatuses 20', 21', 22', 23' and 24' installed in various areas of the world, or may be connected directly to the call center 19 by a private line.

Although only a monitoring apparatus and a call center are illustrated in each country for simplicity in FIG. 1, an arrangement similar to the illustrated network 5, automated teller machines 1 and 2 and automated teller machines 2 to 4 is, in fact, provided in each country. The respective automated teller machines, monitoring apparatuses and call centers have such internal structures as shown as enlarged in the drawing and operate similarly. The monitoring apparatus 6 in the drawing is shown as a representative of monitoring apparatuses installed in a country, and thus the monitoring apparatuses 20', 21', 22', 23' and 24' installed in various countries have a similar internal structure.

Each of the automated teller machines 1 and 2 has a display 12 for displaying a guidance to each customer to guide various transaction operations, a touch panel 13 for entering data according to the operational guide, a money input/output part 14 for processing paper money or bill and coins paid or deposited as input or output money, a card part 15 for reading or writing an inserted magnetic card, a bankbook part 16 for reading or writing a magnetic stripe region of the inserted bankbook and printing its transaction contents thereon, a storage 18 for storing a program, input data and transmission/reception data, and a controller 17 for performing general control thereover.

Telephone sets (such as telephone devices 3, 4 and 27) for speech are installed to automated teller machines 1 and 2, the call centers 19 to 24 or in the vicinity thereof.

The monitoring apparatus 6 (similarly to the monitoring apparatuses 20', 21', 22', 23' and 24') has a communication part 9 for managing and controlling the networks 5 and 7 and forwarding customer's inquiry to a call center; a storage 11 for sequentially registering run information sent from the automated teller machines 1 and 2, operation instructions to the automated teller machines 1 and 2 sent from the call centers 19 to 24, business information of the call centers 19 to 24, operator information and so on; and a controller 10 for performing general control over the monitoring apparatus.

The call centers 19 to 24 are installed in the same areas or the like as the monitoring apparatuses 6 and 20' to 24' located in various areas of the world. Each of the call centers has a storage 28 for storing the run information of the inquired automated teller machines 1 and 2, operation information, fault information, and operator's input information of the call centers 19 to 24, a display 25 for displaying these information thereon, a touch panel 26 for entering an operation instruction to the automated teller machines 1 and 2 or machine information for inquiry, a telephone device 27 for use in inquiry from the user of the automated teller machines 1 and 2 or in questioning and diagnosing a fault declaration, and an operator 30. These display 25, touch panel 26, telephone device 27 and operator 30 are provided within the call center by a necessary number according to the necessary number of automated teller machines to be installed.

Figure 2:
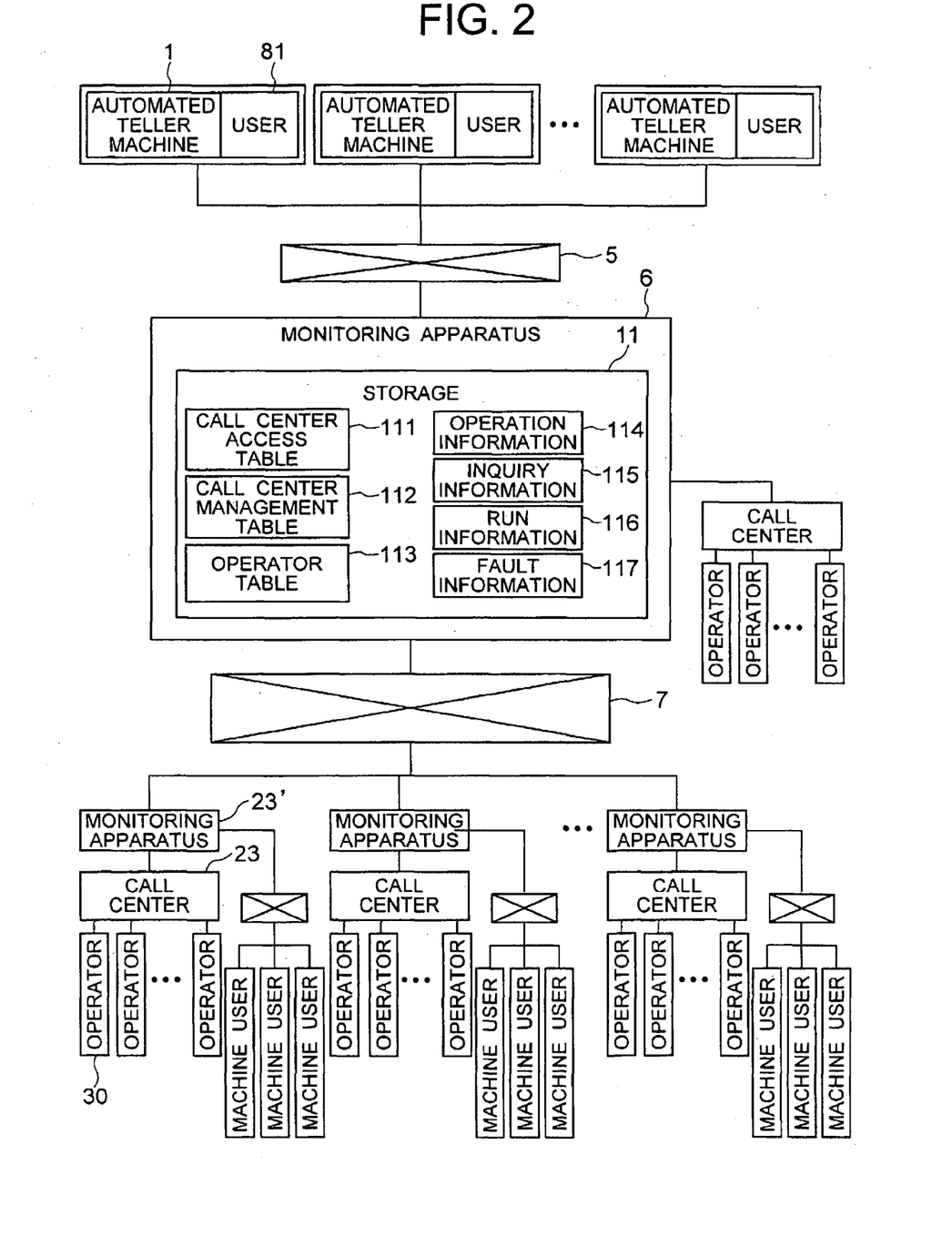
FIG. 2 is a functional block diagram of the monitoring system of the embodiment.

FIG. 2 is a functional block diagram of the monitoring system for the automated teller machine in accordance with the present invention, wherein parts having the same functions as those in FIG. 1 are denoted by the same reference numerals or symbols.

As shown in FIG. 2, the storage 11 of the monitoring apparatus 6 stores a call center access table 111 for storing call centers to be accessed in a priority order at intervals of a predetermined time, a call center management table 112 for storing the business states of the call centers, an operator table 113 for storing operator information including languages usable for the respective operators of the call centers, degrees of reception skill and knowledge levels for the operators, operation information 114, inquiry information 115, run information 116, and fault information 117.

(Embodiment 1)

In a first embodiment of the present invention, when the automated teller machine 1 installed in the territory of Japan (any country may be exemplified, but Japan is used as an example herein) is used at such midnight that the call center 23 in Japan already closes its service and the automated teller machine 1 installed in Japan is used, and when the user of the automated teller machine 1 got confused with how to operate the automated teller machine, user's inquiry can be accepted by an in-service call center installed in another country.

Figure 3:
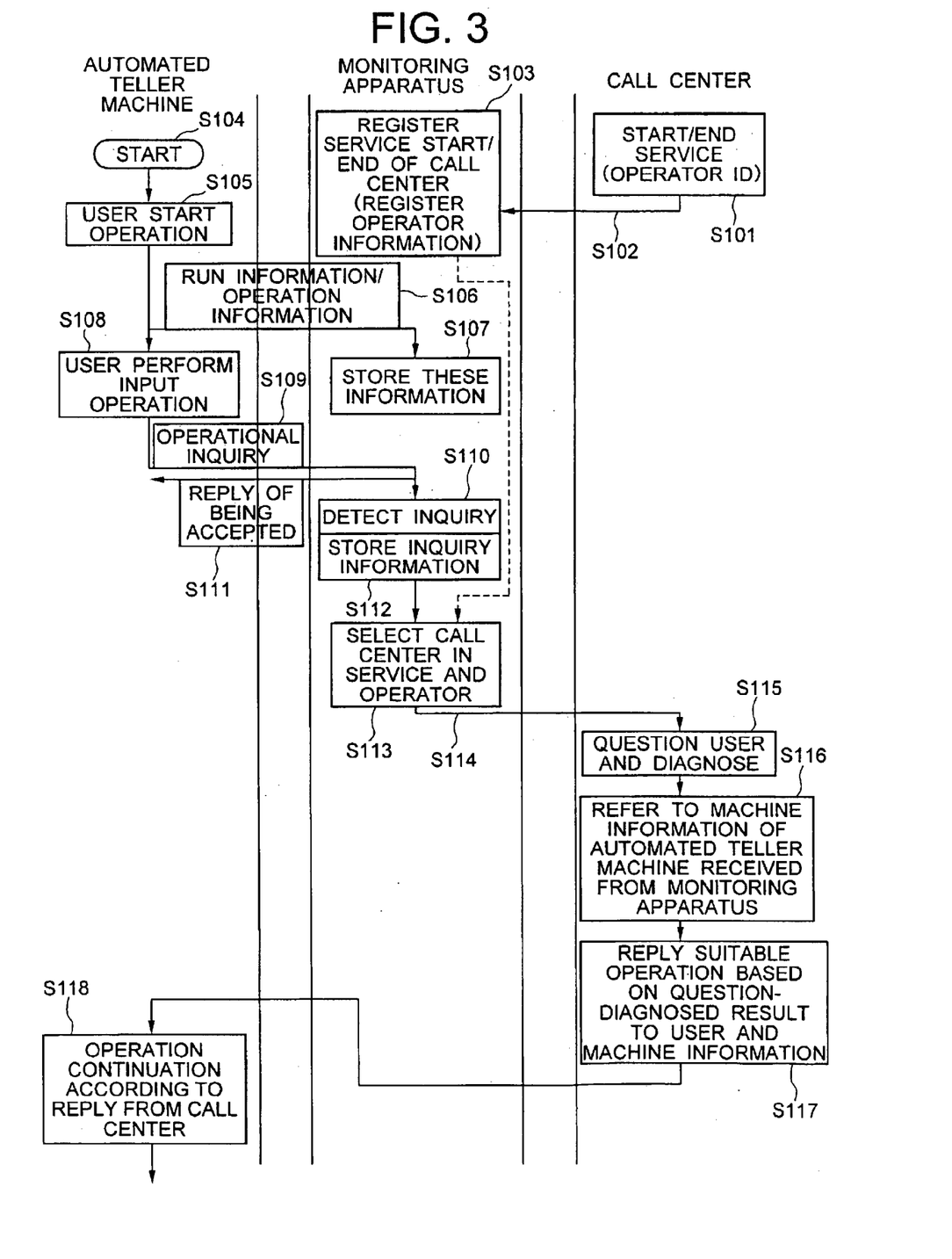
FIG. 3 is a first embodiment of the present invention, that is, an operational flow chart for explaining how to process an inquiry in a method for operating the monitoring system.

FIG. 3 shows a first embodiment of the present invention, that is, an operational flow chart for explaining how to process an inquiry in a method for operating the monitoring system for the automated teller machine.

The first embodiment of the present invention will be detailed by referring to the flow chart of FIG. 3.

When the operator of the call center 23 first enters own operator ID using the touch panel 26 within the call center at the time of starting his job (step S101), the controller 29 registers information indicative of the job start of the operator in the storage 28, and transmits the information to the monitoring apparatus 23' together with operator information about the operator previously registered in the storage 28 (step S102). As mentioned above, each of the monitoring apparatus 20' to 24' have a structure similar to the monitoring apparatus 6 in the drawing. Thus, when the interior of the monitoring apparatus is referred to in the following explanation, it will be explained by using the same reference numerals as used for internal constituent components of the monitoring apparatus 6.

The monitoring apparatus 23' registers the operator information sent from the call center 23 in the operator table 113 of the storage 11 and also registers information indicative of the service start of the call center 23 in the call center management table 112 (step S103). Further, the monitoring apparatus transmits similar information (service start/operator information) to monitoring apparatuses located in various areas of the world.

Figure 4:
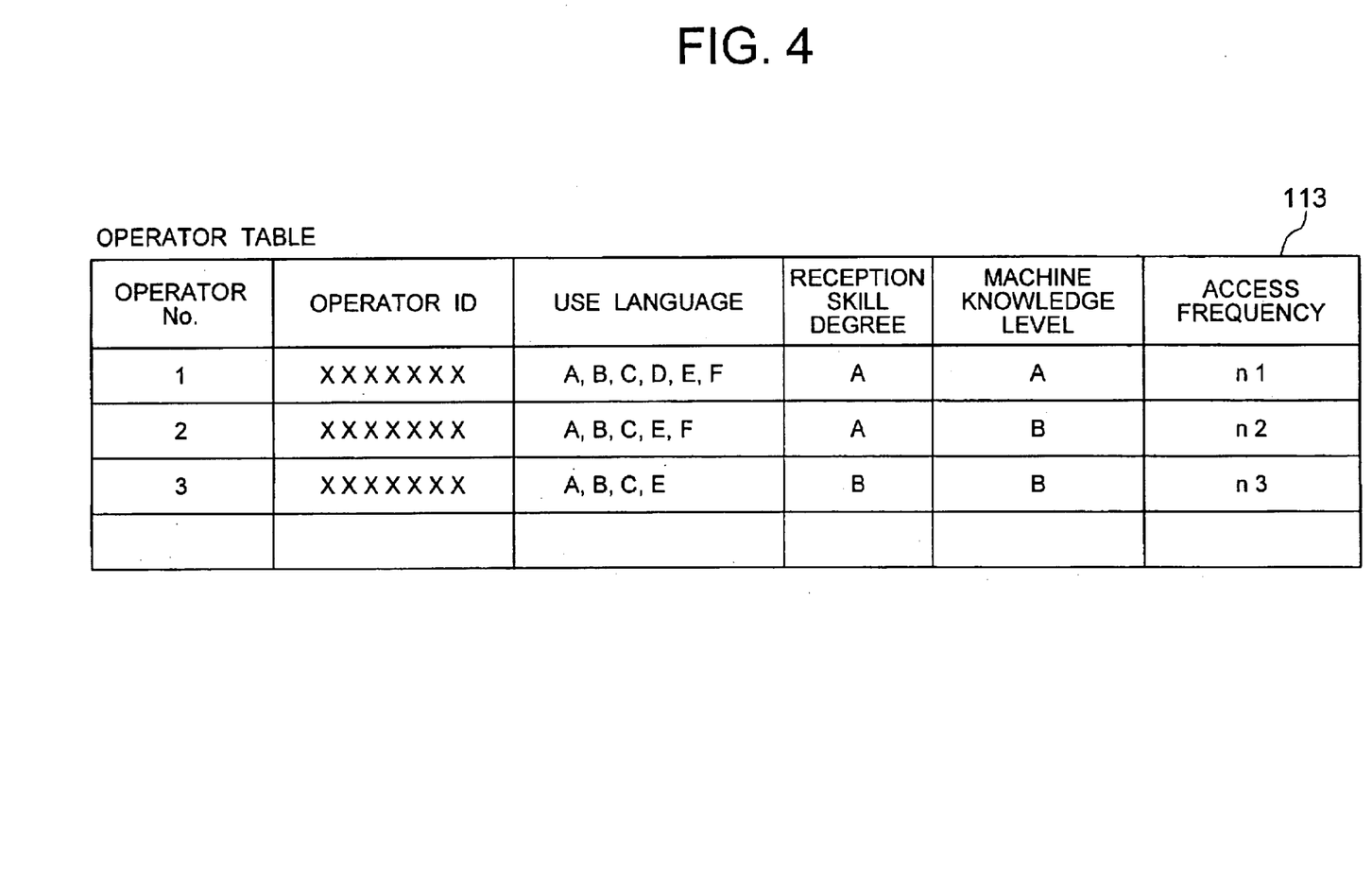
FIG. 4 shows an example of an operator table 113.
Figure 5:
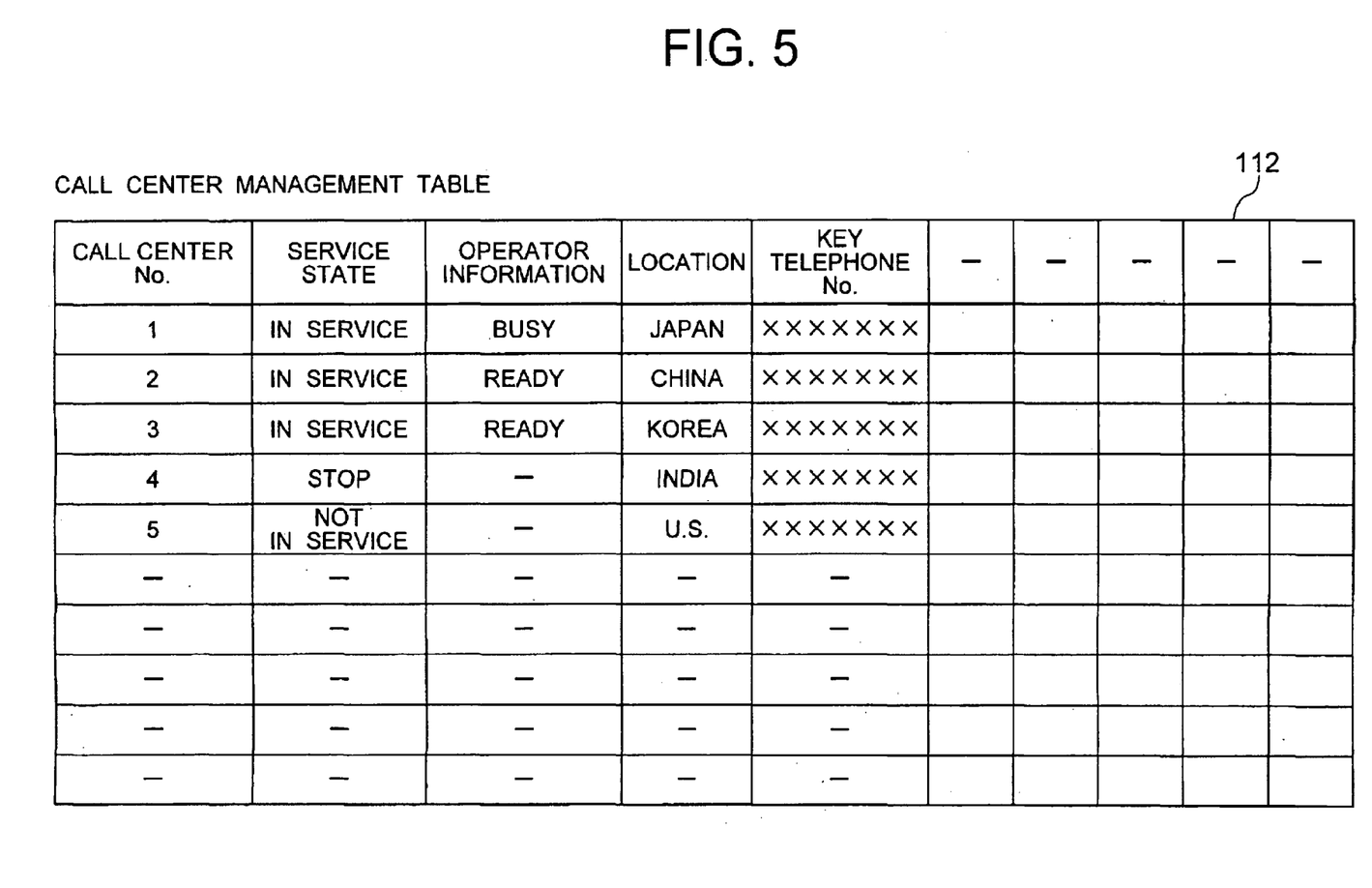
FIG. 5 shows an example of a call center management table 112.

FIG. 4 shows an example of the operator table 113 and FIG. 5 shows an example of the call center management table 112. As shown in FIG. 4, the operator table 113 contains operator information sent from the call center 23, that is, ID for each operator, language (for example, English (A), French (B), Chinese (C), German (D), Spanish (E), Japanese (F), and so on) usable by the operator, degree of reception skill (classified into ranks A, B, ... depending on the degree of reception skill), device knowledge level (classified into ranks A, B, ... depending on the knowledge level of the device), and operator's access frequency to prevent concentration of access by a specific operator and to disperse access more effectively. The use language, reception skill degree and device knowledge level are set by an administrator on the basis of, for example, operator himself or the results of training lectures, tests and so on. The access frequency is assumed to be updated by each access of the associated operator. As shown in FIG. 5, further, the call center management table 112 contains service/non-service (the call center is in service or not) for each call center, operator information indicative of being busy or idle, location (country), and key telephone number.

Figure 6:
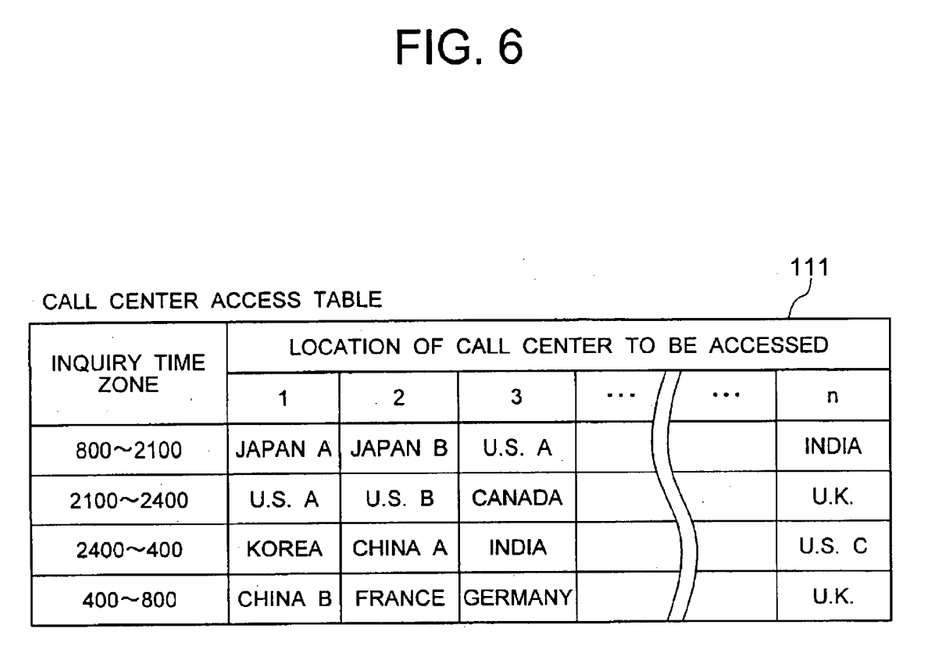
FIG. 6 shows an example of a call center access table 111.

Previously stored in the storage 11 is the call center access table 111 having accessing call centers registered in a priority order. That is, the call centers to be assumed to be open or in service (e.g., judging from jet jag or time difference or the like) are sequentially registered with respect to each inquiry time zone in the call center access table 111. FIG. 6 is an example of the call center access table 111.

Figure 7:
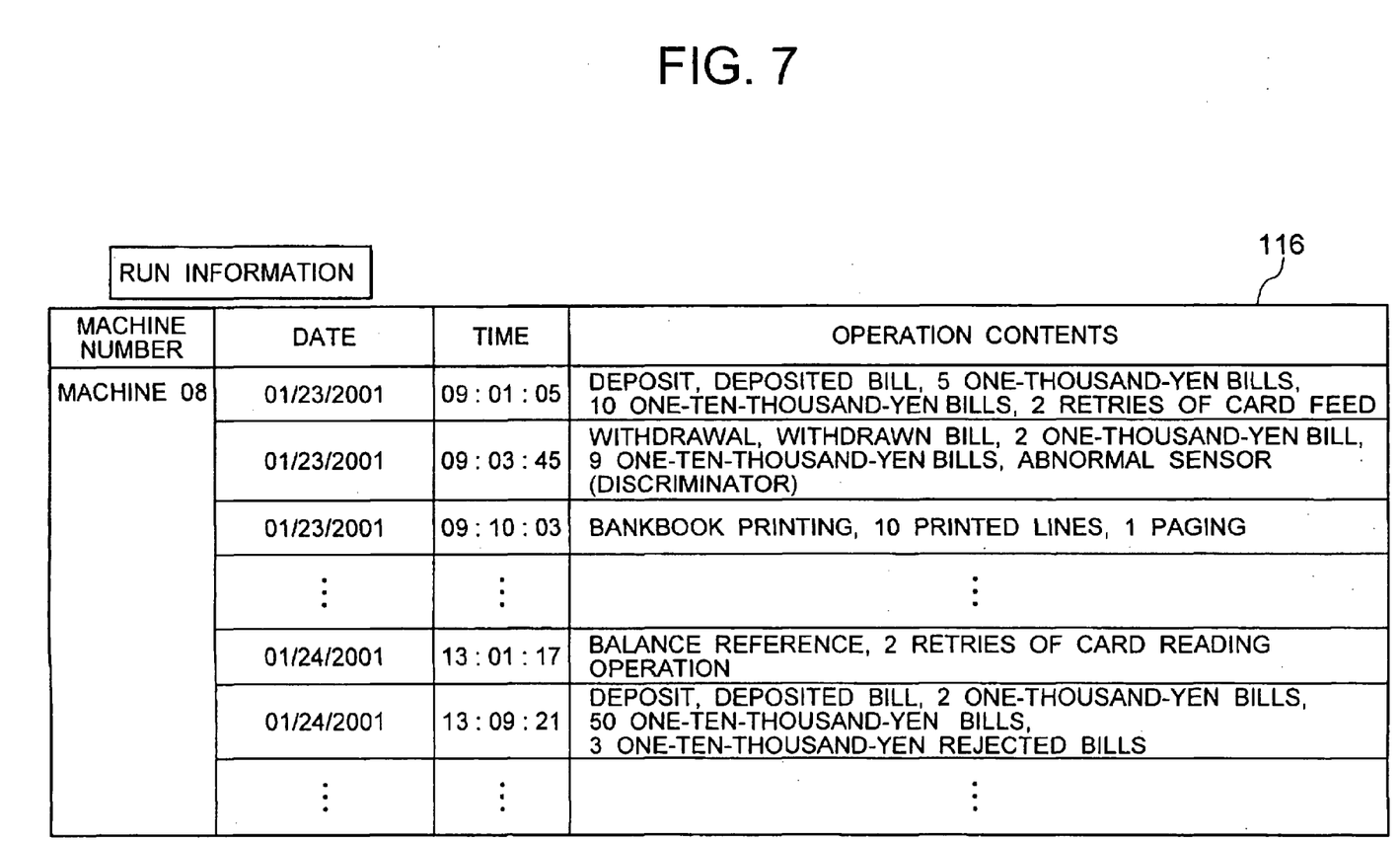
FIG. 7 shows an example of run information 116.
Figure 8:
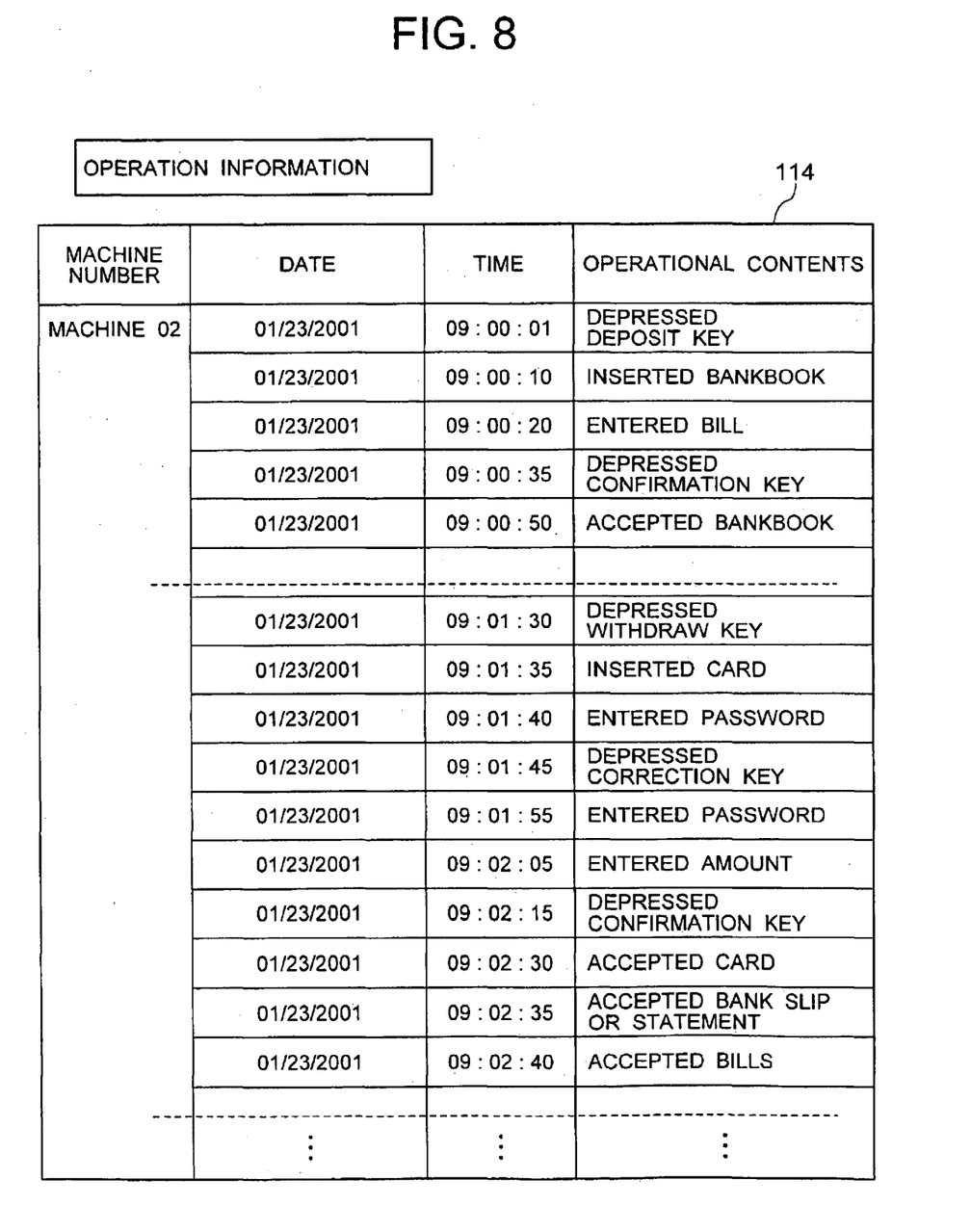
FIG. 8 shows an example of operation information 114.

When each automated teller machine is started in its transaction operation by a user (steps S104 and S105), the automated teller machine transmits the run information (indicating when and how the machine was operated) of the machine and operation information (when and how the user operated the machine) of the user at intervals of a constant time to the monitoring apparatus 6 (step S106). The monitoring apparatus 6 in turn stores the received information as the run information 116 and operation information 114 in the storage 11 (step S107). FIG. 7 shows an example of the run information 116, which contains a machine number (the number of an automated teller machine), a date, time (when the machine was operated), and run contents (of the machine). FIG. 8 shows an example of the operation information 114, which contains a machine number, a date, time and run contents (of the automated teller machine). In this connection, the date and time for the run and operation information may be automatically attached and transmitted based on a clock provided in the automated teller machine.

The user conducts desired transacting operations according to the operational guidance appeared on the display 12 of the automated teller machine 1 (step S108), and, when the user gets confused with how to operate the machine on the way, the user makes a call over the monitoring apparatus 6 for operation inquiry using the telephone device 3 installed in the vicinity of the automated teller machine 1 (step S109). Upon the inquiry, the user enters inquiry information including desired language, inquiry type, installation location, date, time, inquiry contents from the push buttons of the telephone device according to the inquiry guidance bonded on the machine or appeared on the display 12. With regard to a language to be used, the standard language of each country may be automatically attached as a default value on the basis of the area where the automated teller machine is installed, or the user may optically specify a desired language on the guidance display screen.

Figure 9:
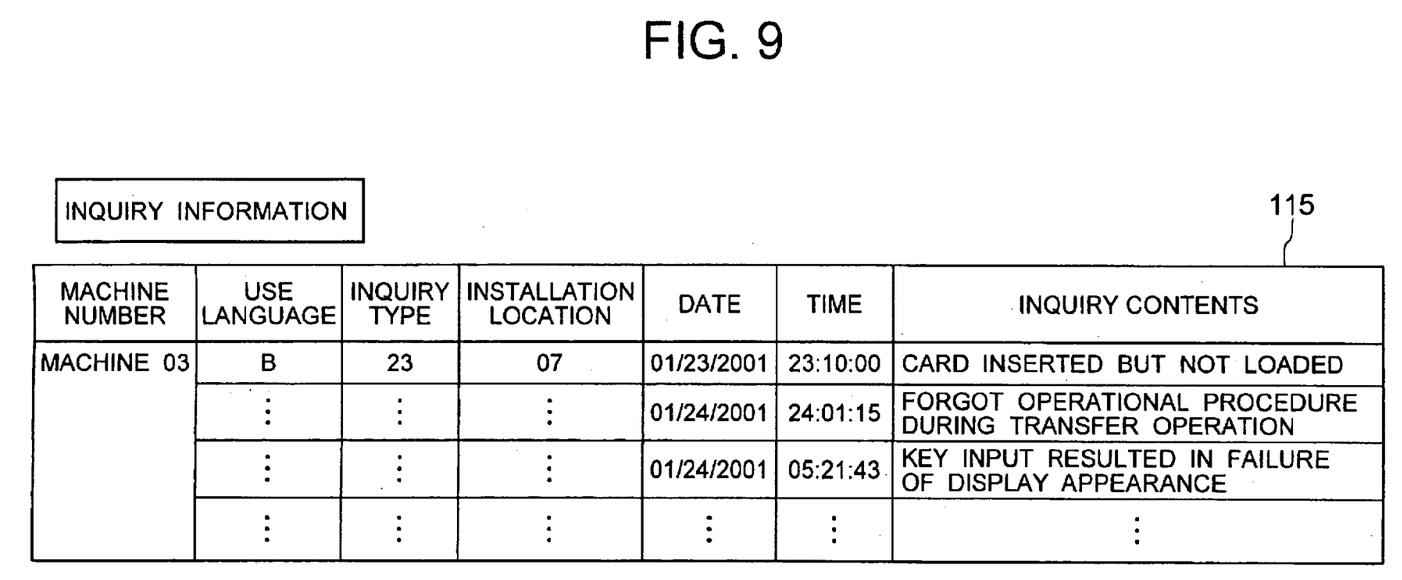
FIG. 9 shows an example of inquiry information 115.

The monitoring apparatus 6, when detecting and accepting a user's inquiry (step S110), the apparatus informs the user of being accepted (step S111), and also stores the inquiry information 115 in the storage 11 (step S112). FIG. 9 is an example of the machine number, use language desired by the user, inquiry type, installation location, date, time and inquiry contents in the inquiry information 115. In this case, the word "inquiry type" as used herein refers to any of, e.g., operation-associated inquiry, fault-associated inquiry and business-/transaction-associated inquiry, or a general type of the inquiry transaction (such as money payment or withdrawal, money deposit or transfer).

The monitoring apparatus 6 selects one of call centers to be accessed on the basis of the call center access table 111 in the storage 11, and performs searching/selecting operations to see whether or not the selected call center is open or in service and its operator can answer to it using the call center management table 112 (step S113).

Further, the monitoring apparatus searches the operator table 113 for the "use language" of the operator coinciding with the "use language" of the inquiry information 115 and the operator of the "machine knowledge level" and "reception skill degree" corresponding to the "inquiry type", "machine number" and "installation location" of the inquiry information 115, selects a desired operator, specifies the ID of the operator for the call center, and then forwards the user's inquiry to the call center.

When no conditions are provided for the operator selection, such a problem that inquiries tend to concentrate on a specific operator is considered. In the present embodiment, to avoid this, the selection of the desired operator is carried out, for example, as follows. The access frequencies ni (i=1,2,3 . . . ) of all operators are first initialized previously at zero. And when the monitoring apparatus receives an inquiry from a user, the apparatus selects one of the operators who can use a use language usable by the user and who has a high degree of reception skill and a high level of machine knowledge to cause the selected operator to access the user, and counts up the access frequency of the corresponding operator by one. Subsequently, even when an inquiry is issued from a user, the apparatus similarly counts up the access frequency of the selected operator. When the access frequency reaches a predetermined value, e.g., 3, the monitoring apparatus is operated to cause the operator not to be selected as an operator for the subsequent inquiries. In this way, the apparatus is designed so that the apparatus accepts inquiries from users and, when all the operators make one round of rotation (that is, when the access frequencies of all the operators who can use the desired use language in the inquiry reach a predetermined value (e.g., 3)), the apparatus resets the access frequencies of all the operators at zero to enable acceptance of an inquiry from a user as in the first case.

As another selection method, the monitoring apparatus is designed so that the access frequencies ni (i=1,2,3, . . . ) of all the operators are first initialized at zero and so that, when receiving an inquiry from a user, the apparatus selects one of the operators who can use a use language desired by the user and who has a high level of reception skill and a high level of machine knowledge to cause the selected operator to access the user for the inquiry, and counts up the access frequency of the selected operator by one. Subsequently, when the apparatus receives an inquiry from another user, the apparatus does not select the selected operator, selects another one of the operators having an access frequency of zero, and counts up the access frequency of the selected operator. For a next coming inquiry, the apparatus similarly selects one of the operators having an access frequency of zero and counts up the access frequency of the selected operator. When the access frequencies of all the operators who can use the use language desired by the user reach 1, the apparatus selects one of the operators who has a high level of reception skill and a high level of machine knowledge to cause the selected operator to access the user for the inquiry, and counts up the access frequency of the selected operator by one. Subsequently, when receiving an inquiry from another user, the apparatus is designed not to select the previously-selected operator, to select one of the operators who has an access frequency of 1, and counts up the access frequency of the selected operator. When the access frequencies of all the operators reach a predetermined value (e.g., 3), the apparatus resets the access frequencies of all the operators at zero and gets ready for an inquiry from another user as in the first case. As a result, a specific operator can be prevented from being accessed concentratedly.

Further, the monitoring apparatus also transmits machine information (run information and operation information) received and stored in the storage 11 at intervals of a constant time after starting the transacting operation to the associated call center (step S114).

The operator of the call center inquires and analyses the installation location of the inquired automated teller machine 1, user's operational situations, etc. (step S115), and as necessary, refers to the detailed information of the automated teller machine 1 from the machine information of the automated teller machine 1 received from the monitoring apparatus 6 (step S116).

The operator replies a suitable operational method on the basis of the question inquired result with the user and the detailed information of the automated teller machine 1 (step S117). The user, on the basis of operator's reply, continues his operations (step S118).

(Embodiment 2)

A second embodiment will next be detailed in connection with a case where the automated teller machine 1 is used at such midnight that a call center located in the territory of Japan is not in service, a user gets a trouble such as an improper feed in his magnetic card inserted thereinto during his operation, and an in-service call center located in another country accepts a fault declaration from the user, by referring to the drawings.

Figure 10:
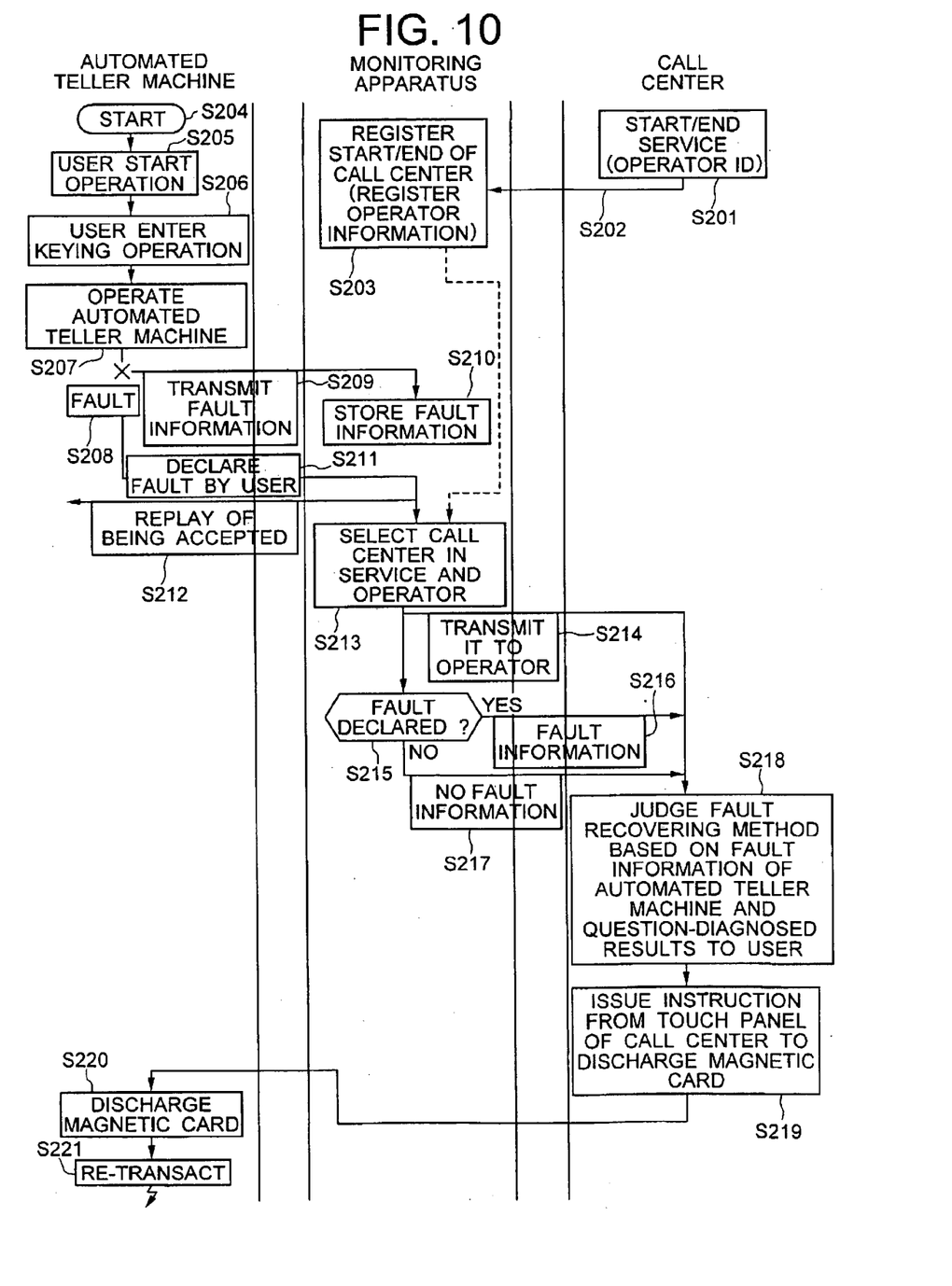
FIG. 10 is an operational flow chart of a second embodiment of the present invention for explaining how to process an inquiry in a method for recovering the monitoring system from a fault.

FIG. 10 is an operational flow chart of the second embodiment of the present invention for explaining how to recover a fault in a monitoring system for an automated teller machine.

When the operator of the call center 23 first enters his operator ID on the touch panel 26 within the call center at its service start time (step S201), the controller 29 registers information indicating that the operator started his work in the storage 28, and transmits the entered operator ID together with operator information relating to the operators previously registered in the storage 28 to the monitoring apparatus 6 (step S202).

The monitoring apparatus 6 registers the operator information sent from the call center 23 in the operator table 113 (refer to FIG. 4) of the storage 11, and also registers information indicative of the service start of the call center 23 in the call center management table 112 (refer to FIG. 5) (step S203). Further, the monitoring apparatus transmits similar information (service start/operator information) to respective monitoring apparatuses located in various areas of the world.

Also previously set in the storage 11 is a call center access table 111 (refer to FIG. 6) in which call centers to be accessed are previously set and registered in a priority order. That is, call centers assumed to be open or in service (e.g., judging from time difference and so on) are sequentially registered at in each time zone of an inquiry in the call center access table 111.

When a user gets a trouble during his use of the automated teller machine 1 (steps S204 to S208), the automated teller machine 1 transmits trouble information indicative of a fault occurrence to the monitoring apparatus 6 (step S209). The transmitted information includes the machine number, use language desired by the user, fault occurrence date, operation history, fault occurred location and used medium.

The monitoring apparatus 6 saves the received fault information in the storage 11 (step S210).

Figure 11:
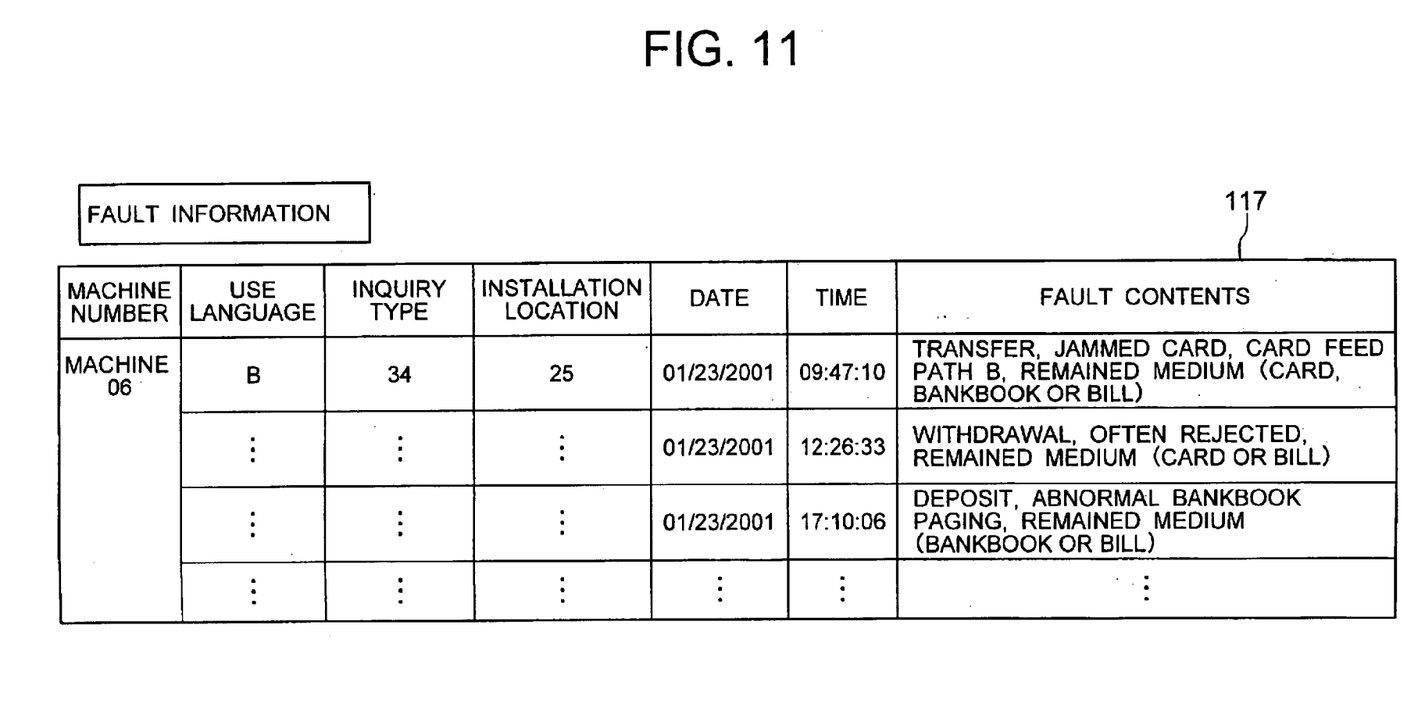
FIG. 11 shows an example of fault information 117.

FIG. 11 shows an example of the fault information 117, showing machine numbers, use languages, inquiry types, installation locations, dates, time, fault contents (operation history, fault occurred locations, used media) as an example.

Thereafter, when the user of the automated teller machine 1 informs the monitoring apparatus 6 of the fault using the telephone device 3 (step S211), as in the foregoing first embodiment, the monitoring apparatus 6 informs the user of the fault declaration being accepted (step S212), selects in-service call centers previously stored in the call center management table 112 of the storage 11, searches the operator table 113 based on the fault information 117 to selects an optimum operator (step S213), specifies the ID of the selected operator, and transmits the user's inquiry to the call center (step S214). For preventing a specific operator from being concentratedly accessed, a method similar to in the above first embodiment may be employed.

At the same time, the monitoring apparatus 6 judges whether or not a fault announcement is made from the automated teller machine 1 (step S215). In the case of presence of the announcement, the monitoring apparatus informs the call center of the previously-received fault information and in the case of absence of the announcement, the monitoring apparatus informs the call center of no declaration (steps S216 and S217).

The operator of the call center determines a fault recovering method on the basis of the fault information of the automated teller machine 1 and the question-diagnosed result with the user (step S218). In the present example, since the fault comes from the improper feeding of the magnetic card, a card discharging instruction is issued from the call center to the automated teller machine 1 via the monitoring apparatus 6 (step S219) to eject the magnetic card from the automated teller machine (step S220). The user again tries to conduct the transacting operation using the ejected magnetic card (step S221).

As has been explained in the foregoing, in accordance with the present invention, the monitoring apparatus can select optimum one of call centers located in various areas of the world which is in service in response to an inquiry deep into night or early in the morning and can cope with the inquiry for connection thereof. As a result, even when a call center located in an area where the automated teller machine is installed is not in service hours, the monitoring apparatus can suitably reply the inquiry from the user and cope with it in real time, thus enabling smooth 24-hour operation of the automated teller machine.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A system for monitoring an automated teller machine, comprising:

a first call center for operating said automated teller machine via a line;

a second call center installed in an area which has a time different from an area where said first call center is installed; and a monitoring apparatus for receiving run information or operation information of said automated teller machine, selecting one of said first and second call centers, and transmitting the received run or operation information to the selected call center, wherein said monitoring apparatus includes:

a storage for storing service hours of said first and second call centers and use languages and machine knowledge levels of operators of said first and second call centers; and a controller for searching said storage on the basis of a use language of a user, a machine number of said automated teller machine and an inquiry type received from the automated teller machine, and selecting the call center when the searching time is in service hours stored in said storage, the use language received from the automated teller machine coincides with the use language of the operator stored in said storage, and the machine number and an inquiry type correspond to machine knowledge level of the operator stored in said storage.

2. The monitoring system as set forth in claim 1, wherein said monitoring apparatus includes:

counting means for counting up access frequencies to the operators of said first and second call centers from said monitoring apparatus for each operator and storing the access frequencies therein; and control means for not transmitting the run information and operator information to the operator having an access frequency stored in said counting means at a predetermined value and for resetting a count frequency stored in said counting means when the access frequencies of a plurality of operators reach a predetermined value.

3. The monitoring system as set forth in claim 1, wherein said first call center transmits service information including service hours to said monitoring apparatus when the first call center started or ended its service, said second call center transmits service information including service hours to a monitoring apparatus different from said monitoring apparatus when the second call center started or ended its service, and said monitoring apparatus transmits the received service information of the first call center to said different monitoring apparatus.

4. A monitoring apparatus for an automated teller machine which performs a predetermined transaction operation by selectively entering information according to an instruction on a guidance display screen via a line and for connection to a plurality of call centers which accept a consultation relating to the automated teller machine, comprising:

first storage means for storing service information of said call centers and operator information relating to operators of the call centers for each call center;

second storage means for storing run information of said automated teller machine received from said automated teller machine and operation information of a user thereof;

control means for searching for service information and operator information stored in said first storage means in response to a request from said automated teller machine to select a call center; and communication means for transmitting the run information and operation information stored in said second storage means to the call center selected by said control means, wherein:

said first storage means stores at least a use language and a machine knowledge level for each operator as said operator information, and said selection of a call center by said control means is carried out on the basis of the fact that the use language of the user received from said automated teller machine coincides with the use language of an operator stored in said first storage means and that said machine knowledge level stored in said first storage means for the operator corresponds to the run information stored in said second storage means.

5. The monitoring apparatus as set forth in claim 4, wherein said automated teller machine includes:

a display for displaying a guidance on its display screen to a user and guiding various transactions;

a touch panel for entering data according to the guidance appearing on the display screen;

a money input/output part for processing paper money or coins deposited or discharged;

a card part for reading or writing a magnetic card inserted; and a bankbook part for reading or writing a magnetic stripe of an inserted bankbook and printing transaction contents on the bankbook.

6. The monitoring apparatus as set forth in claim 4, wherein said plurality of call centers are installed in areas having a time difference therebetween, and each of the call centers include:

display means for displaying run information and operation information transmitted by said respective communication means thereon; and input means for inputting an operational instruction to said monitoring apparatus.

7. The monitoring apparatus as set forth in claim 4, wherein said second storage mans stores at least deposit and withdrawal operations of the automated teller machine, types of handled bills, the number of handled bills and abnormal information of the automated teller machine for each time zone as the run information, and also stores at least a user's input on the automated teller machine, medium inserting and accepting operation as the operation information.

8. The monitoring apparatus as set forth in claim 4, wherein, when receiving an operational inquiry of the user from said automated teller machine, said control means stores the received inquiry information in said second storage means, and said communication means transmits the inquiry information stored in said second storage means to the call center selected by said control means.

9. The monitoring apparatus as set forth in claim 4, wherein said first storage means stores fault information received from said automated teller machine, said control means judges whether or not the fault information is stored in said second storage means when receiving a fault declaration from said automated teller machine, and said control means transmits the fault information of said second storage means together with the fault declaration to the call center selected by said control means when determining that the fault information is stored.

10. A monitoring apparatus connected to a plurality of call centers via a line for monitoring an automated teller machine, comprising:
   a storage for storing machine information of said automated teller machine, machine knowledge levels of operators of the call centers, use languages of the operators of the call centers, and service information of the call centers; and
   a controller, responsive to inquiry information or fault declaration information received from said automated teller machine, for selecting one of said call centers to which the inquiry information or fault declaration information is to be transmitted on the basis of said machine information, said machine knowledge levels, said use languages and said service information stored in said storage, wherein:
   said inquiry information includes a machine number of the automated teller machine, user's use language, an inquiry type, installation location of the automated teller machine, a transmission time, and an inquiry contents, and
   said controller searches for one of the operators whose use language included in said inquiry information coincides with the use language of the operator stored in said storage and who has a machine knowledge level corresponding to said machine number and inquiry type included in said inquiry information.

11. The monitoring apparatus as set forth in claim 10, wherein said machine information includes a machine number of the automated teller machine, a record of deposit and withdrawal of the automated teller machine, type information of bill deposited and withdrawn, and a record of insertion or discharge of a medium into or from the automated teller machine.

12. The monitoring apparatus as set forth in claim 10, wherein, when receiving said fault declaration information from said automated teller machine, said controller previously receives the fault information including a fault occurrence location in the automated teller machine and a handled medium in the automated teller machine and judges whether or not the information is stored in said storage.

13. An apparatus for monitoring an automated teller machine, comprising:
   a communication part, for receiving information from the automated teller machine and for sending information to a selected one of a plurality of call centers;
   storage for storing machine information of the automated teller machine and machine knowledge levels of operators at the call centers; and
   a controller responsive to receipt of inquiry information or fault declaration information from the automated teller machine, for selecting one of the call centers to which to transmit the received inquiry information or fault declaration information based on correspondence of the machine information of the automated teller machine to a stored machine knowledge level of an operator at the selected call center.

14. A method for monitoring an automated teller machine, comprising:
   receiving inquiry information or fault declaration information from the automated teller machine;
   searching knowledge levels of operators at a plurality of call centers to select a call center based on correspondence of machine information of the automated teller machine or the received inquiry information to a stored knowledge level of an operator at the selected call center; and
   sending the received inquiry information or fault declaration information from the automated teller machine to the selected call center.

* * * * *